March 19, 1929.   H. G. FRENCH   1,706,113

ELECTRIC SWITCH

Filed Sept. 23, 1925

Inventor:
Henry G. French,
by
His Attorney.

Patented Mar. 19, 1929.

1,706,113

UNITED STATES PATENT OFFICE.

HENRY G. FRENCH, OF SCHENECTADY, NEW YORK, ASSIGNOR TO GENERAL ELECTRIC COMPANY, A CORPORATION OF NEW YORK.

ELECTRIC SWITCH.

Application filed September 23, 1925. Serial No. 58,174.

My invention relates to electric switches of the truck panel type and an object of my invention is the provision in a switch of this type of improved means automatically effective upon the withdrawal of the truck from its housing for grounding the circuit controlled thereby.

My invention will be better understood from the following description taken in connection with the accompanying drawing, and its scope will be pointed out in the appended claims.

Figure 1:
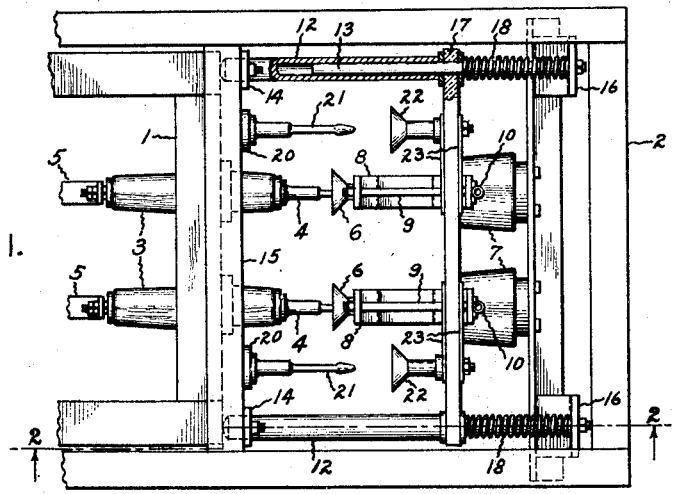
Figure 2:
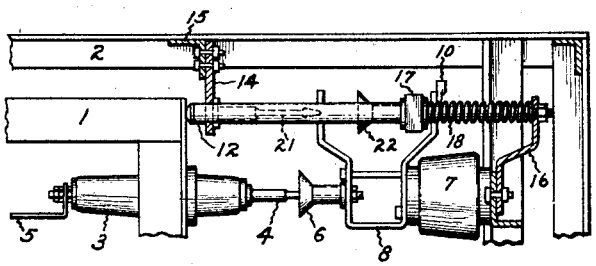
Figure 3:
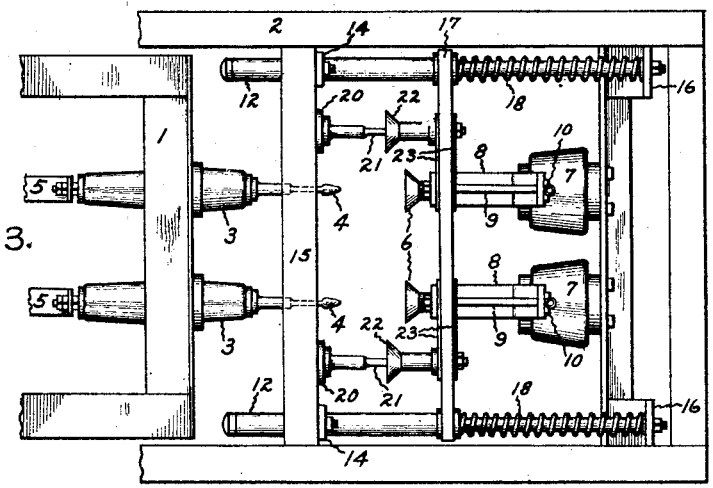

Referring to the drawing, Fig. 1 is a top plan view of portion of a truck panel and housing therefor illustrating my invention; Fig. 2 is a cross sectional view taken on the line 2—2 of Fig. 1; and Fig. 3 is a view similar to Fig. 1 with the exception that the truck panel is partially withdrawn from the housing.

In the drawing the rear portion of the truck panel is shown at 1 and the housing therefor at 2. The truck panel has the two insulator bushings 3 carrying the main plug contact members 4 which are connected by the straps 5 with the switch and other apparatus (not shown) mounted on the truck panel. Cooperating main socket contact members 6 are supported from the housing by insulators 7. Between each insulator and its socket member 6 is a conducting frame 8 shown as having a modified U-shape, the ends of the legs of which are connected by a guide rod 9. The rear leg of each frame has the lead terminal 10 secured thereto. Movement of the truck panel into the housing from the position illustrated by Fig. 3 to that illustrated by Figs. 1 and 2 causes the main contacts 4 and 6 to engage and conversely when the truck panel is withdrawn these contacts separate.

Where a switch of this type is employed to control a circuit, for example a feeder circuit, upon which work is to be done it is often found desirable not only to completely isolate the circuit by withdrawing the truck panel but to ground both sides of the circuit as well. By so doing a workman on the circuit may feel a greater degree of security.

In accordance with my invention, I have provided the housing with grounding switches which are adapted to operate automatically when the truck panel is withdrawn and the main contacts separated to ground both sides of the circuit controlled by the switch. For this purpose I have shown telescoping guide rods 12 and 13, the former being mounted to slide in the bracket 14 attached to the cross bar 15 of the housing and the latter being secured to the housing by the bracket 16. Bar 17 of insulating material is slidingly mounted on the guide rods 13 and on each of these rods between the bar 17 and bracket 16 is a compression spring 18 to urge the bar and contacts carried thereby to the extreme forward position. Fixed to the cross bar 15 by brackets 20 are the auxiliary plug contacts 21 which may be grounded through the housing or by the use of a separate ground wire. Cooperating with the plug contacts 21 are the auxiliary socket contacts 22 which are secured to the bar 17. The rods 9 pass through the bar 17 and on each side of the bar I have shown a conducting strip 23 which are for the purpose of conductively connecting each socket contact with the adjacent rod 9. However, when the truck panel is withdrawn as shown in Fig. 3 the springs 18 hold the forward strip 23 firmly against the forward leg of the frame 8 providing good electrical connection therewith.

It will be seen from Fig. 3 that while the truck panel is withdrawn from the housing, the springs 18 hold the bar 17 in its forward position with the auxiliary grounding contacts 21 and 22 in engagement whereby both sides of the outgoing circuit are grounded. As the truck panel is pushed into the housing, it first engages the guide rods 12 which in sliding on the guide rods 13 compress springs 18 and move the contacts 22 back out of connection with the grounded contacts 21. Thereafter the main contacts 4 and 6 become engaged to complete the main circuit to the apparatus carried by the truck panel. Withdrawal of the truck panel is first accompanied by the isolation of the main circuit by the separation of the main contacts 4 and 6 and the subsequent grounding of both sides thereof through the contacts 21 and 22.

While I have described only one embodiment of my invention, I do not wish to be limited to the particular form shown and described as it will be apparent that many modifications therein may be made without departing from the scope of my invention as set forth in the appended claims.

What I claim as new and desire to secure by Letters Patent of the United States is:—

1. In combination, a truck panel, a housing therefor, cooperating main contacts carried respectively by the truck panel and the housing, an auxiliary contact in electrical connection with one of said main contacts, a movable support therefor, a cooperating auxiliary contact having a ground connection, and means responsive to the withdrawal movement of the truck panel for moving the support to cause the auxiliary contacts to engage.

2. In combination, a truck panel, a housing adapted to receive the same, main cooperating contacts supported respectively by the truck panel and the housing, a fixed grounded auxiliary contact and an insulating reciprocably mounted member supported by the housing, a cooperating auxiliary contact carried by the member and connected with said housing main contact, means adapted to be engaged by said truck panel for moving said member to separate said auxiliary contacts, and resilient means for opposing said movement.

3. In combination, a truck panel, a housing adapted to receive the same, main contacts supported by the housing, cooperating main contacts carried by the truck panel, guide rods mounted on the housing, a transverse insulating rod mounted to slide on the guide rods, auxiliary contacts mounted on the rod and connected respectively with the main contacts of the housing, grounded cooperating auxiliary contacts fixed to the housing in front of the movable auxiliary contacts, resilient means for moving the rod forward, and means engaged by the truck panel when moved into the housing for moving the rod rearwardly to cause the auxiliary contacts to separate.

In witness whereof I have hereunto set my hand this 22nd day of September, 1925.

HENRY G. FRENCH.